United States Patent
Brown et al.

[11] Patent Number: 5,989,146
[45] Date of Patent: Nov. 23, 1999

[54] ON-DEMAND FOUR-WHEEL DRIVE TRANSMISSION

[75] Inventors: David Brown, Hopton, United Kingdom; Alan P. Zajac, Clay, N.Y.

[73] Assignee: New Venture Gear, Inc., Troy, Mich.

[21] Appl. No.: 09/018,191

[22] Filed: Feb. 4, 1998

Related U.S. Application Data

[60] Provisional application No. 60/041,285, Mar. 21, 1997.

[51] Int. Cl.$^6$ .......................... B60K 17/354; F16H 37/08
[52] U.S. Cl. .......................... 475/207; 475/204; 180/247; 180/249
[58] Field of Search .................... 475/204, 206, 475/207; 180/247, 248, 249

[56] References Cited

U.S. PATENT DOCUMENTS

| | | |
|---|---|---|
| 2,262,710 | 11/1941 | Lang . |
| 3,235,021 | 2/1966 | Hill . |
| 3,732,943 | 5/1973 | Panhard . |
| 4,417,642 | 11/1983 | Suzuki et al. .................. 475/204 X |
| 4,441,575 | 4/1984 | Suzuki ............................ 475/204 X |
| 4,449,604 | 5/1984 | Suzuki ............................ 180/247 X |
| 4,552,241 | 11/1985 | Suzuki .................................. 180/249 |
| 4,643,045 | 2/1987 | Katayama . |
| 4,671,136 | 6/1987 | Katayama . |
| 4,779,699 | 10/1988 | Hatano . |
| 4,805,484 | 2/1989 | Hiraiwa ........................... 180/247 X |
| 4,805,720 | 2/1989 | Clenet . |
| 4,817,753 | 4/1989 | Hiketa . |
| 4,831,891 | 5/1989 | Kato et al. . |
| 4,875,698 | 10/1989 | Uchiyama . |
| 5,042,610 | 8/1991 | Shiraishi et al. . |
| 5,046,998 | 9/1991 | Frost . |
| 5,086,867 | 2/1992 | Hirota et al. . |
| 5,123,293 | 6/1992 | Umemoto et al. . |
| 5,143,167 | 9/1992 | Moriyama et al. . |
| 5,188,574 | 2/1993 | Echigo et al. . |
| 5,370,018 | 12/1994 | Kwasniewski . |
| 5,443,426 | 8/1995 | Frost . |
| 5,582,263 | 12/1996 | Varma et al. .......................... 180/247 |
| 5,662,543 | 9/1997 | Forsyth .............................. 180/249 X |
| 5,704,866 | 1/1998 | Pritchard et al. ...................... 475/206 |
| 5,853,342 | 12/1998 | Pritchard et al. ...................... 475/206 |

FOREIGN PATENT DOCUMENTS

2035930  6/1989  United Kingdom .

*Primary Examiner*—Charles A Marmor
*Assistant Examiner*—Scott Lund
*Attorney, Agent, or Firm*—Harness, Dickey & Pierce, P.L.C.

[57] ABSTRACT

A transmission for a four-wheel drive vehicle having a multi-speed geartrain and power transfer mechanism incorporated into a common housing assembly. The multi-speed geartrain includes a input shaft, a mainshaft, and a plurality of constant-mesh gearsets arranged for selectively coupling the mainshaft to the input shaft for driven rotation at various speed ratios. The mainshaft can be selectively coupled to the power transfer mechanism for establishing two alternative power transmission routes. In particular, a synchronized range shift mechanism is provided for establishing a high-range transmission route and a low-range transmission route from the mainshaft to a primary driveline to define a two-wheel drive mode. A portion of the drive torque delivered to the primary driveline can be transferred automatically through a transfer clutch to the secondary driveline to establish an on-demand four-wheel drive mode. As an option, a mode clutch can be provided for permitting the secondary driveline to be locked to the primary driveline for establishing a part-time four-wheel drive mode.

22 Claims, 6 Drawing Sheets

| GEAR | RATIO | CLUTCH SLEEVE 120 | CLUTCH SLEEVE 134 | CLUTCH SLEEVE 156 | CLUTCH SLEEVE 172 |
|---|---|---|---|---|---|
| REV-LOW | -10.513 | A | D | R | N |
| 1ST-LOW | 10.475 | A | D | N | L |
| 2ND-LOW | 7.350 | B | D | N | L |
| 3RD-LOW | 5.241 | A | C | N | L |
| 1ST-HIGH | 3.677 | B | C | N | L |
| 2ND-HIGH | 2.686 | A | D | N | H |
| 3RD-HIGH | 1.885 | B | D | N | H |
| 4TH-HIGH | 1.3438 | A | C | N | H |
| 5TH-HIGH | 0.9429 | B | C | N | H |
| REV-HIGH | -4.083 | B | D | R | N |

ON-DEMAND FOUR-WHEEL DRIVE TRANSMISSION

This application claims benefit of provisional application Ser. No. 60/041,285 filed Mar. 21, 1997.

BACKGROUND OF THE INVENTION

The present invention relates generally to transmissions for use in four-wheel drive vehicles. More particularly, the present invention is directed to a transmission having a multi-speed geartrain and a power transfer mechanism contained in a single unit.

As is known, the majority of four-wheel drive vehicles are equipped with a transfer case mounted to a multi-speed transmission for directing power from the engine to all four wheels. To accommodate different road surfaces and conditions, many transfer cases are equipped with a mode shift mechanism which permits the vehicle operator to selectively couple the non-driven wheels to the driven wheels for establishing a part-time four-wheel drive mode in addition to the two-wheel drive mode. Other transfer cases are equipped with a transfer clutch that is passively or actively controlled in response to driveline slip for automatically delivering drive torque to the non-driven wheels and establishing an on-demand four-wheel drive mode. In addition, some transfer cases are also equipped with a two-speed range shift mechanism for permitting the vehicle operator to select between a high-range and a low-range four-wheel drive mode.

In an effort to minimize the overall size of the drivetrain used in four-wheel drive vehicles, it has been proposed to utilize a transmission of a transaxle-type normally used to drive the front wheels of a front wheel drive vehicle as a four-wheel drive geartrain. In particular, British Patent No. 2,035,930 to Jones et al. teaches of rotating the front wheel drivetrain (i.e., engine and transaxle) 90° such that the transaxle outputs can be interconnected to the front and rear drivelines of the motor vehicle. While such an arrangement may provide an economical drivetrain layout for a full-time four-wheel drive vehicle, the practical applications for such an arrangement are severely limited. In particular, such an arrangement does not permit the vehicle operator to selectively shift "on-the-fly" between high and low four-wheel drive modes, nor can one of the outputs be selectively disconnected from its driveline for establishing a two-wheel drive mode.

Accordingly, the need exists for a transmission which can be used in most conventional four-wheel drive applications and which permits the vehicle operator to selectively shift between the available drive modes and speed ranges.

SUMMARY OF THE INVENTION

It is therefore an object of the present invention to provide a transmission for use with four-wheel drive vehicles having a multi-speed geartrain and a power transfer mechanism integrated into a single unit.

According to yet another object, the transmission has a power transfer mechanism arranged to deliver drive torque to the primary driveline for establishing a two-wheel drive mode. The power transfer mechanism is further equipped with a transfer clutch for automatically delivering drive torque to the secondary driveline in response to certain vehicular conditions for establishing an on-demand four-wheel drive mode.

As an additional object, the power transfer mechanism may optionally be equipped with a mode clutch for rigidly coupling the secondary driveline to the primary driveline for establishing a part-time four-wheel drive mode.

Accordingly, the transmission of the present invention includes a multi-speed geartrain including a input shaft, a mainshaft, and a plurality of constant-mesh gearsets which can be selectively engaged to couple the mainshaft to the input shaft for driven rotation at various speed ratios. The mainshaft can be selectively coupled to a power transfer mechanism for establishing two alternative power transmission routes. In particular, the power transfer mechanism includes a synchronized range shift mechanism which is operable for establishing a high-range transmission route and a low-range transmission route from the mainshaft to the primary driveline. The power transfer mechanism is further equipped with a transfer clutch which can be passively or automatically actuated to transfer drive torque from the primary driveline to the secondary driveline.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENTS

The present invention relates generally to a transmission for use in four-wheel drive vehicles having a multi-speed geartrain and a power transfer mechanism integrated into a common housing assembly. The transmission is operable for transferring power from a longitudinally-aligned engine to the primary and secondary drivelines of a four-wheel drive vehicle. In particular, the power transfer mechanism interconnects the output of the geartrain to the primary driveline for establishing a two-wheel drive mode. A transfer clutch is incorporated into the power transfer mechanism to automatically deliver drive torque to the secondary driveline in response to the occurrence of certain vehicular conditions for establishing an on-demand four-wheel drive mode. In addition, an optional mode select mechanism may be provided for permitting a vehicle operator to intentionally select operation of the transmission in either of the on-demand four-wheel drive mode or a part-time four-wheel drive mode.

Figure 1:
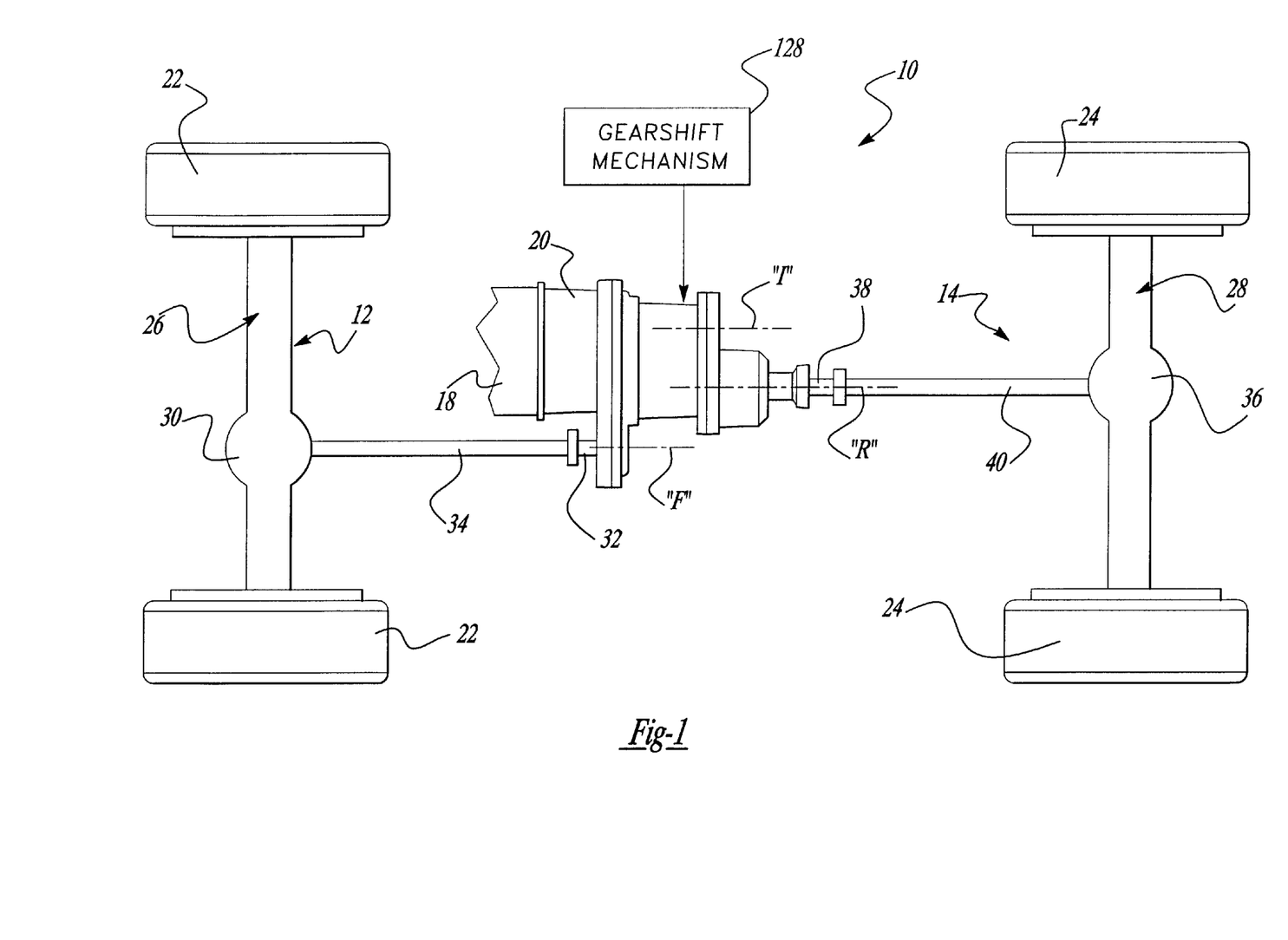
FIG. 1 illustrates the drivetrain for a four-wheel drive motor vehicle equipped with a transmission according to the present invention.

Referring to FIG. 1, a motor vehicle 10 is schematically shown. Vehicle 10 has a primary driveline 14 and a secondary driveline 12 selectively drivable from a source of power, such as an engine 18, through a transmission 20. Engine 18 is mounted in an in-line or longitudinal orientation along the long axis of vehicle 10 and its output is coupled to the input of transmission 20. Front and rear sets of wheels 22 and 24 are part of front and rear drivelines 12 and 14, respectively, and are connected at opposite ends of front and rear axle assemblies 26 and 28, respectively. Front axle assembly 26 includes a front differential 30 that is coupled to a front output 32 of transmission 20 via a front propshaft 34. Likewise, rear axle assembly 28 includes a rear differential 36 that is coupled to a rear output 38 of transmission 20 via a rear propshaft 40. As is conventional, one or more universal joints (not shown) may be installed on opposite ends of propshafts 34 and 40, as required. As will be detailed, an inherent feature of transmission 20 is that its outputs 32 and 38 can be offset relative to each other as well as to the transmission input to provide improved underbody packaging. As shown, the input to transmission 20 is rotatable about a first axis ("I") while front and rear outputs 32 and 38 are respectively shown rotatable about a second axis ("F") and a third axis With particular reference to FIGS. 2 and 3, transmission 20 is shown to include two primary sections, namely, a multi-speed geartrain 42 and a power transfer mechanism 44, both of which are located with a housing assembly 45. Geartrain 42 includes an input shaft 46 driven by the output of engine 18 through engagement of a conventional manually-operable clutch (not shown), a mainshaft 48, and a series of constant-mesh gearsets 50, 52 and 54. As will be detailed, each gearset can be selectively engaged for coupling mainshaft 48 to input shaft 46 for rotation at a predetermined gear or speed ratio. Thus, rotary power (i.e., drive torque) from engine 18 is selectively delivered from input shaft 46 to mainshaft 48 through the gearsets. Thereafter, power is delivered from mainshaft 48 to rear output 38 via power transfer mechanism 44. In general, power transfer mechanism 44 includes a planetary gearset 56 having an input member driven by mainshaft 48 and an output member driving rear output 38, and a synchronized range shift mechanism 58 for causing rear output 38 to be driven by mainshaft 48 at one of two different speed ratios. As such, transmission 20 is operable to normally drive rear driveline 14 for defining the two-wheel drive mode. Power transfer mechanism 44 further includes a transfer clutch 60 operable for automatically transferring drive torque from rear output 38 to front output 32 in response to the occurrence of certain vehicular conditions, thereby establishing the on-demand four-wheel drive mode.

Figure 2:
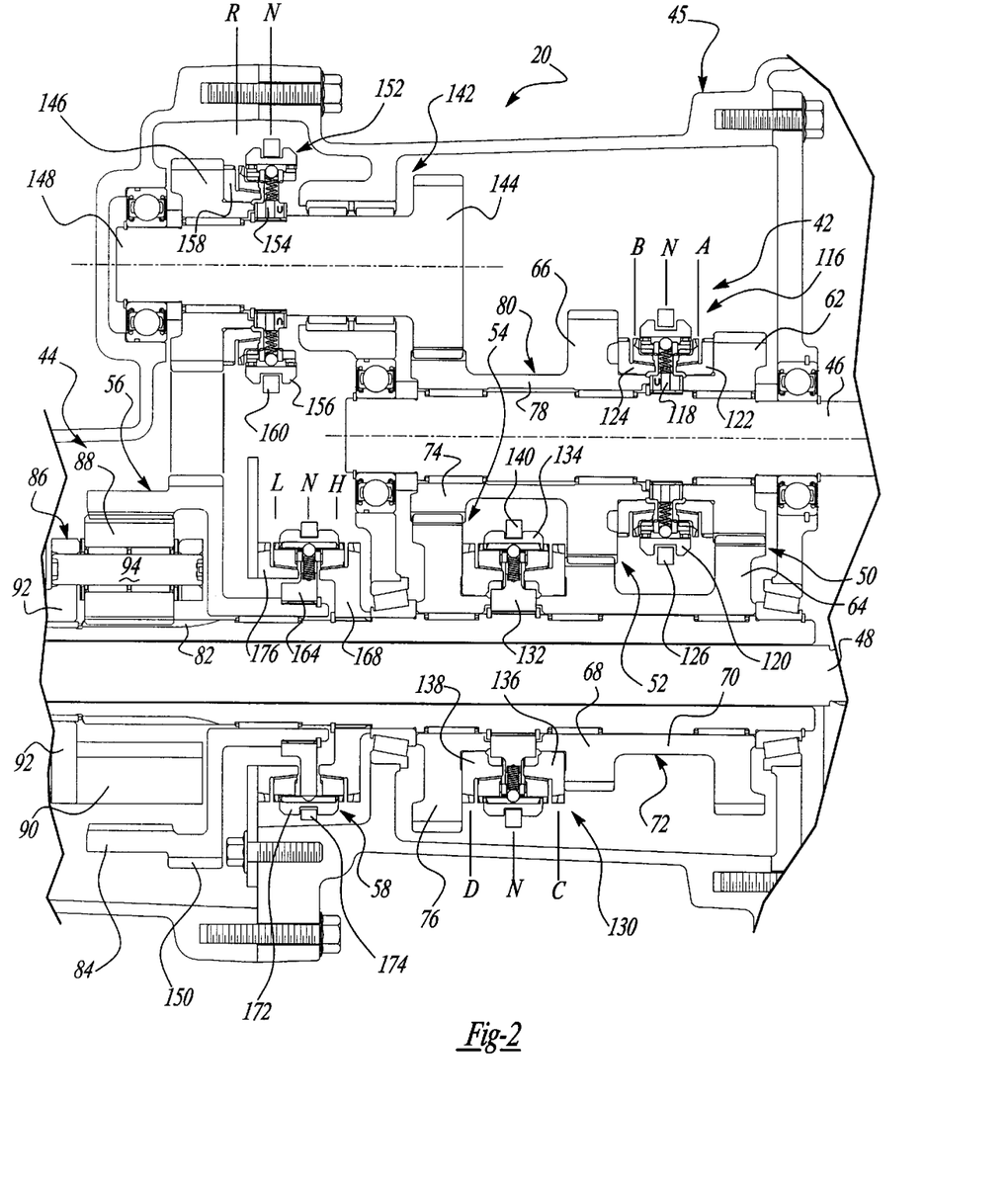
FIG. 2 is a partial sectional view of the transmission showing its multi-speed geartrain.

With continued reference to FIG. 2, first gearset 50 is shown to include a first input gear 62 rotatably supported on input shaft 46 and which is in constant mesh with a first drive gear 64 rotatably supported on mainshaft 48. Second gearset 52 includes a second input gear 66 rotatably supported on input shaft 46 and which is in constant mesh with a second drive gear 68 rotatably supported on mainshaft 48. First drive gear 64 and second drive gear 68 are shown integrally formed on a stubshaft 70 to define a first compound gear 72. Third gearset 54 is shown to include a third input gear 74 rotatably supported on input shaft 46 and which is in constant mesh with a third drive gear 76 rotatably supported on mainshaft 48. Second input gear 66 and third input gear 74 are integrally formed on a stubshaft 78 for defining a second compound gear 80.

Figure 3:
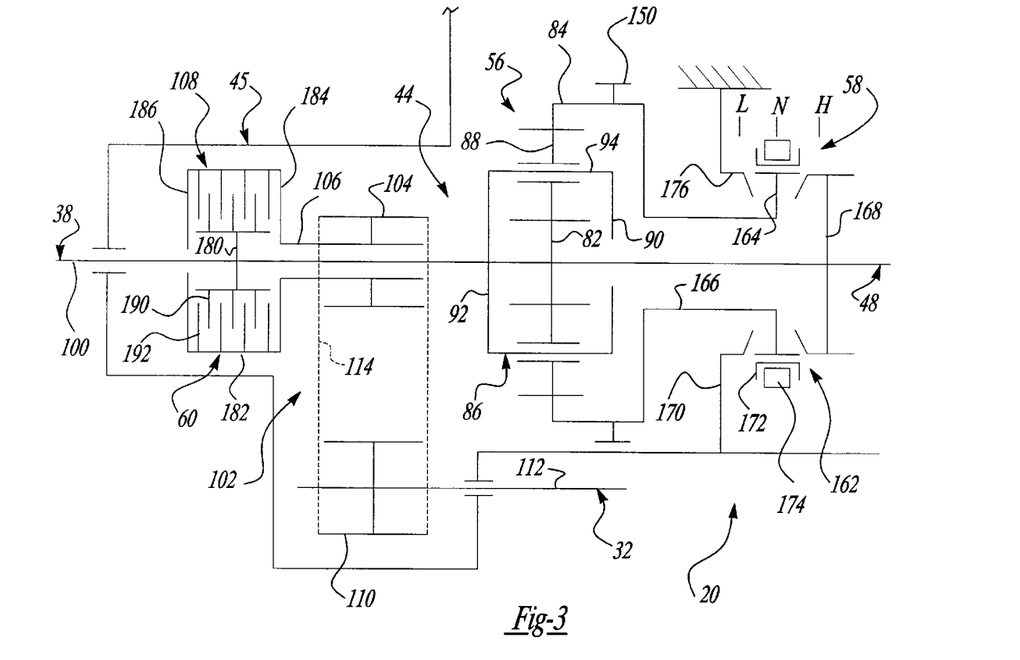
FIG. 3 is a partial schematic view showing a power transfer mechanism driven by the transmission geartrain.

Planetary gearset 56 includes a sun gear 82 formed integrally on an end portion of mainshaft 48, a ring gear 84, and a carrier assembly 86 having a plurality of pinion gears 88 rotatably supported therefrom which are meshed with sun gear 82 and ring gear 84. In particular, carrier assembly 86 includes a front carrier plate 90 and a rear carrier plate 92 which are suitably interconnected, with pinion shafts 94 extending therebetween on which pinion gears 88 are rotatably supported. As schematically shown in FIG. 3, rear carrier plate 92 is fixed to rear output 38, shown as a rear output shaft 100, which is adapted to be interconnected to rear propshaft 40 in a conventional manner. To provide means for transferring drive torque from transfer clutch 60 to front output 32, a drive mechanism 102 is provided. Drive mechanism 102 includes a drive sprocket 104 fixed to a hub 106 of an outer drum 108 associated with transfer clutch 60, a driven sprocket 110 fixed to a front output shaft 112, and a continuous drive chain 114 meshed with both drive sprocket 104 and driven sprocket 110. Front output shaft 112 is adapted to be connected to front propshaft 34 in a conventional manner.

As noted, geartrain 42 is arranged to deliver drive torque at various speed ratios from input shaft 46 to mainshaft 48. As such, geartrain 42 includes a first synchronizer clutch assembly 116 operably installed between first input gear 62 and second input gear 66 on input shaft 46. First synchronizer clutch assembly 116 includes a hub 118 fixed for rotation with input shaft 46 and a clutch sleeve 120 supported for rotation with and bi-directional axial movement on hub 118. First synchronizer clutch assembly 116 is shown as a single-cone type arrangement with it understood that any suitable synchronizer clutch used for effecting synchronous gear changes between input shaft 46 and mainshaft 48 may be used. When clutch sleeve 120 is moved from the neutral position shown and denoted by reference line "N" to the position denoted by reference line "A", it functions to couple first input gear 62 to input shaft 46. In particular, movement of clutch sleeve 120 from its neutral (N) position to its (A) position caused synchronization between input shaft 46 and first input gear 62 such that the spline teeth of clutch sleeve 120 move into meshed engagement with clutch teeth on a clutch ring 122 fixed to first input gear 62. Conversely, when clutch sleeve 120 is moved from the neutral (N) position to the position denoted by construction line "B", it couples second input gear 66 to input shaft 46. Such movement of clutch sleeve 120 from its neutral (N) position to its (B) position causes speed synchronization between second compound gear 80 and input shaft 46 and permits the spline teeth of clutch sleeve 120 to move into engagement with clutch teeth formed on a clutch ring 124 fixed to second input gear 66. Clutch sleeve 120 is axially moveable relative to hub 118 in a well known manner in response to axial movement of a first shift fork, partially shown at reference numeral 126, caused by a suitable gear shift mechanism, schematically shown in FIG. 1 by block 128.

A second synchronizer clutch assembly 130, also shown as a single-cone arrangement, is operably installed on mainshaft 48 between second drive gear 68 and third drive gear 76. Synchronizer clutch assembly 130 includes a hub 132 fixed for rotation with mainshaft 48 and a clutch sleeve 134 that is supported for rotation with a bi-directional axial movement on hub 132. When clutch sleeve 134 is moved from the neutral position shown and denoted by reference line "N" to the position denoted by reference line "C", it couples second drive gear 68 to mainshaft 48, thereby coupling first compound gear 72 to mainshaft 48. Such movement of clutch sleeve 134 from its (N) position to its (C) position results in speed synchronization between mainshaft 48 and third drive gear 68, and the subsequent movement of the splines on clutch sleeve 134 into engagement with the clutch teeth formed on a clutch ring 136 fixed to second drive gear 68. Conversely, when clutch sleeve 134 is moved from the neutral (N) position to the position denoted by reference line "D", it couples third drive gear 76 to mainshaft 48. Again, following synchronization between third drive gear 76 and mainshaft 48, the spline teeth of clutch sleeve 134 move into meshed engagement with the clutch teeth formed on a clutch ring 138 fixed to third drive gear 76. Clutch sleeve 134 is axially movable between its "C" and "D" positions by means of a second shift fork, partially shown at 140, which is also coupled to gearshift mechanism 128.

Geartrain 42 also includes a synchronized reverse gear assembly 142 having a reverse input gear 144 in constant mesh with third input gear 74 and a reverse output gear 146 which is rotatably supported on a stubshaft 148. As seen, reverse input gear 144 is integrally formed on stubshaft 148. Reverse output gear 146 is in constant mesh with a reverse transfer gear 150 integrally formed on ring gear 84 of planetary gearset 56. This constant meshed engagement is shown schematically by phantom lines in FIG, 2. Additionally, geartrain 42 includes a third synchronizer clutch assembly 152, also shown to be of the single-cone type, which includes a hub 154 fixed (i.e., splined) to stubshaft 148 and a clutch sleeve 156 supported for rotation with and axial sliding movement on hub 154. Clutch sleeve 156 is movable between neutral position shown by reference line "N" to a position denoted by reference line "R" for coupling reverse output gear 146 to stubshaft 148, thereby transferring torque delivered to second compound gear 80 to ring gear 84 of planetary gearset 56 to establish a pair of reverse speed ratios as will be described. Specifically, the splines on clutch sleeve 156 move into engagement with the clutch teeth formed on a clutch ring 158 fixed to reverse output gear 146 following speed synchronization between reverse output gear 146 and reverse input gear 144. A third shift fork, partially shown at 160, is also interconnected to gearshift mechanism 128.

To provide means for delivering drive torque from mainshaft 48 to rear output shaft 100, synchronized range shift mechanism 58 is provided in associated with planetary gearset 56. Synchronized range shift mechanism 58 includes a fourth synchronizer clutch assembly 162 having a hub 164 fixed to an axial hub segment 166 of ring gear 84 which is rotatably supported on mainshaft 48. Synchronizer clutch assembly 162 further includes a drive hub 168 fixed to mainshaft 48 and a brake plate 170 fixed to housing 45. A range sleeve 172 is supported for rotation with and bi-directional axial movement on hub 164 from the central non-actuated neutral (N) position shown to one of a high-range (H) position and a low-range (L) position via movement of a fourth shift fork 174, likewise connected to gearshift mechanism 128. Axial movement of range sleeve 172 from its neutral position (N) to its high-range position (H) results in speed synchronization between mainshaft 48 and ring gear 84. Following such speed synchronization, splines on range sleeve 172 can move into meshed engagement with clutch teeth formed on drive hub 168 for coupling ring gear 84 for direct rotation with mainshaft 48. Since sun gear 82 is also driven directly by mainshaft 48, such locking of ring gear 84 to mainshaft 48 results in carrier assembly 86 being rotatably driven at a direct speed ratio relative to mainshaft 48. Thus, with range sleeve 172 in its high-range (H) position, carrier assembly 86 is driven by mainshaft 48 for supplying drive torque to rear output shaft 100 via a high-range power transmission route. Conversely, axial movement of range sleeve 172 from its neutral (N) position toward its low-range (L) position results in speed synchronization between ring gear 84 and housing 45, whereby ring gear 84 is braked against rotary motion. Following braking of ring gear 84, the splines of range sleeve 172 can move into meshed engagement with clutch teeth formed on a clutch ring 176 fixed to brake plate 170. With ring gear 84 held against rotation, carrier assembly 86 is driven at a reduced speed ratio relative to mainshaft 48 for establishing a low-range power transmission route between mainshaft 48 and rear output shaft 100.

Figure 4:
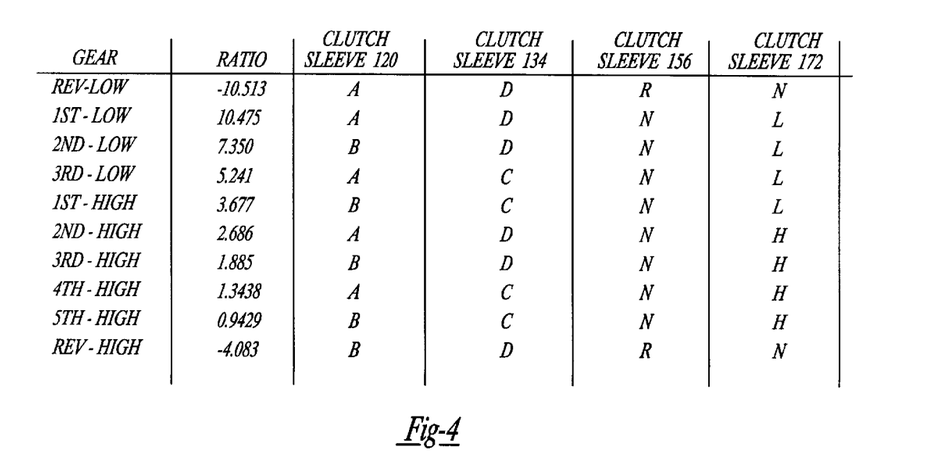
FIG. 4 is a chart listing the speed ratios that are available with the transmission of the present invention.

Referring now to FIG. 4, a chart is shown which identifies the positions of shift sleeves 120, 134, 156 and 172 for establishing at least eight forward speed ratios and a pair of reverse speed ratios. Preferably, the available speed ratios are segregated into a first or "High" set of gears and a second or "Low" set of gears. The High set of gears includes five forward speed ratios and a reverse speed ratio that are particularly well-suited for normal on-road driving conditions. In contrast, the Low set of gears includes three forward speed ratios and a reverse speed ratio that are well-suited for off-road driving needs. As a means of reducing the inertial loading during gear shifting, it can be seen that clutch sleeve 120 moves through its neutral position when shifting between each forward speed ratio. In addition, representative ratio values are listed to illustrate the sequential arrangement provided by transmission 20. To this end, the following Table lists the number of teeth associated with the gear components of transmission 20 for establishing the listed speed ratios. However, those skilled in the art will appreciate that different gear combinations can be used to modify the ratio values required for different vehicular applications.

TABLE

| Gear Component | No. Of Teeth |
| --- | --- |
| first input gear 62 | 32 |
| first drive gear 64 | 43 |
| second input gear 66 | 35 |
| second drive gear 68 | 33 |
| third input gear 74 | 26 |
| third drive gear 76 | 49 |
| sun gear 82 | 30 |
| ring gear 84 | 87 |
| pinion gears 88 | 28 |
| reverse input gear 144 | 28 |
| reverse output gear 146 | 48 |
| reverse transfer gear 150 | 87 |

Gearshift mechanism 128 can be comprised of a shift system having a single gearshift lever for controlling selection of all available ratios. Alternatively, the High set of gears and the Low set of gears could have separate gearshift levers if desired. Gearshift mechanism 128 can be a manually-actuated arrangement having a gearshift lever coupled by a shift assembly to each of the shift forks. Alternatively, an electronically-controlled shift-by-wire arrangement can be used wherein movement of the gearshift lever causes actuation of electrically-operated actuators (i.e., servo motors, electromagnetic solenoids, etc.) which, in turn, cause axial movement of the shift forks.

Referring again to FIG. 3, power transfer mechanism 44 is schematically shown to be equipped with transfer clutch 60 that is operable for controlling the torque split (i.e., distribution ratio) between front output shaft 112 and rear output shaft 100 in response to the magnitude of the rotary speed differential therebetween. According to the embodiment shown, transfer clutch 60 is a sealed hydraulic coupling, such as a viscous coupling, having an inner drum 180 fixed to rear output shaft 100 and outer drum 108 which is supported and sealed relative to inner drum 180 for rotation relative thereto. Outer drum 108 includes a cylindrical housing 182 to which a front end plate 184 and a rear end plate 186 are secured. Front end plate 184 is shown to be fixed to hub 106 for rotation with drive mechanism 102 and front output shaft 112. A clutch pack is retained within the sealed chamber formed between outer drum 108 and inner drum 180 and includes a set of inner clutch plates 190 secured for rotation with inner drum 180 and a set of outer clutch plates 192 secured for rotation with housing 182. Inner and outer clutch plates 190 and 192 are alternately interleaved and the sealed chamber is filled with a predetermined volume of a viscous fluid. As is known, increasing relative rotation between outer drum 108 and inner drum 180 results in shearing of the viscous fluid within the sealed chamber for transferring torque through the clutch pack to the slower rotating components, thereby automatically transferring drive torque to front output shaft 112 when rear output shaft 100 is slipping, Viscous coupling 60 is conventionally referred to as a "passive" torque transfer device which can be tuned to generate progressive torque transfer characteristics that are dependent on the magnitude of the relative speed between clutch plates 190 and 192. Transfer clutch 60 can be tuned to initiate transfer of drive torque to front output shaft 112 only after a certain level of speed differentiation occurs. Alternatively, a small percentage of the total drive torque can be delivered to front output shaft 112 when no slip condition is detected. Furthermore, it is contemplated that other passive torque transfer devices can be substituted for the viscous coupling. For example, commonly-owned U.S. Pat. No. 5,456,642 to Frost discloses a geared traction unit which could easily be adapted for use in transmission 20 as an on-demand torque transfer device. As such, it is to be understood that transfer clutch 60 can be any suitable speed-sensitive and/or torque-sensitive device known to be applicable for use in four-wheel drive vehicles for transferring torque on-demand without input from the vehicle operator.

Figure 5:
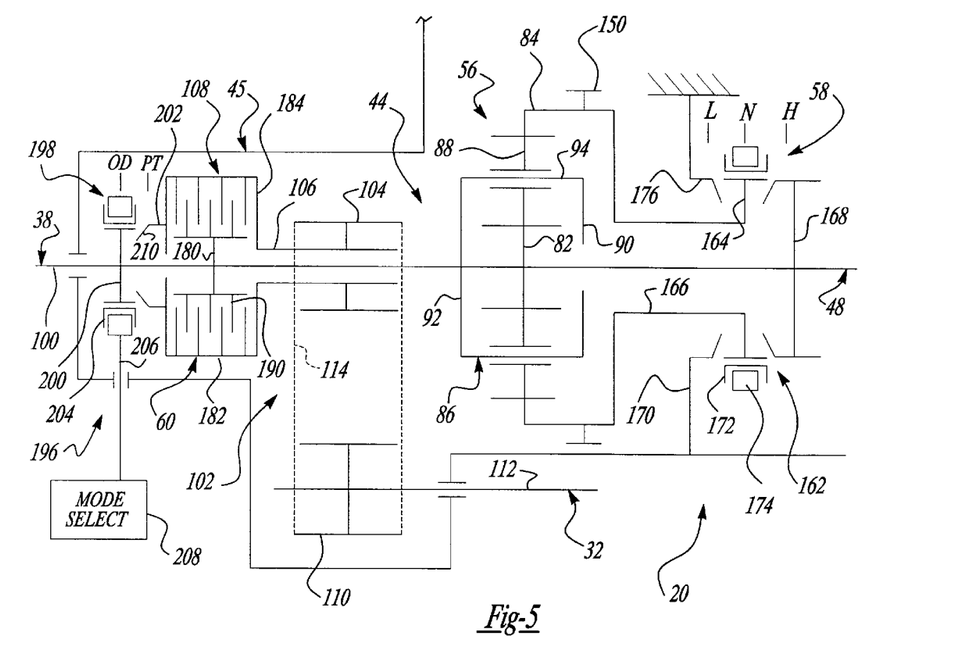
FIG. 5 is a partial schematic view illustrating a modified version of the power transfer mechanism.

Referring to FIG. 5, power transfer mechanism 44 is shown to optionally include a synchronized mode shift mechanism 196 to permit the vehicle operator to select one of an "Automatic" mode and a "Locked" mode. When the Automatic mode is selected, transfer clutch 60 controls the torque transfer to front output shaft 112, whereby transmission 20 is operating in the on-demand four-wheel drive mode. When the Locked mode is selected, front output shaft 112 is rigidly coupled to rear output shaft 100 such that transmission 20 is operating in a part-time four-wheel drive mode. Synchronized mode shift mechanism 196 includes a fifth synchronizer clutch assembly 198 having a hub 200 fixed to rear output shaft 100, a clutch ring 202 fixed to outer drum 108 (or drive sprocket 104), and a mode sleeve 204 supported for rotation with and axial movement on hub 200 between an on-demand (OD) position and a part-time (PT) position via axial movement of a fifth shift fork 206 connected to a mode select mechanism 208. With mode sleeve 204 in its (OD) position, hub 200 is disconnected from clutch ring 202 such that relative rotation is permitted between front output shaft 112 and rear output shaft 100 for establishing the Automatic mode. In contrast, axial movement of mode sleeve 204 from its (OD) position to its (PT) position causes speed synchronization between rear output shaft 100 and front output shaft 112 via synchronizer 210. Thereafter, spline teeth on mode sleeve 204 move into meshed engagement with clutch teeth on clutch ring 202 for coupling drive mechanism 102 for direct rotation with rear output shaft 100, thereby establishing the Locked mode. Mode select mechanism 208 can be any suitable mechanically-actuated or power-operated shift assembly capable of causing movement of mode sleeve 204 in accordance with the particular mode selected by the vehicle operator.

Figure 6:
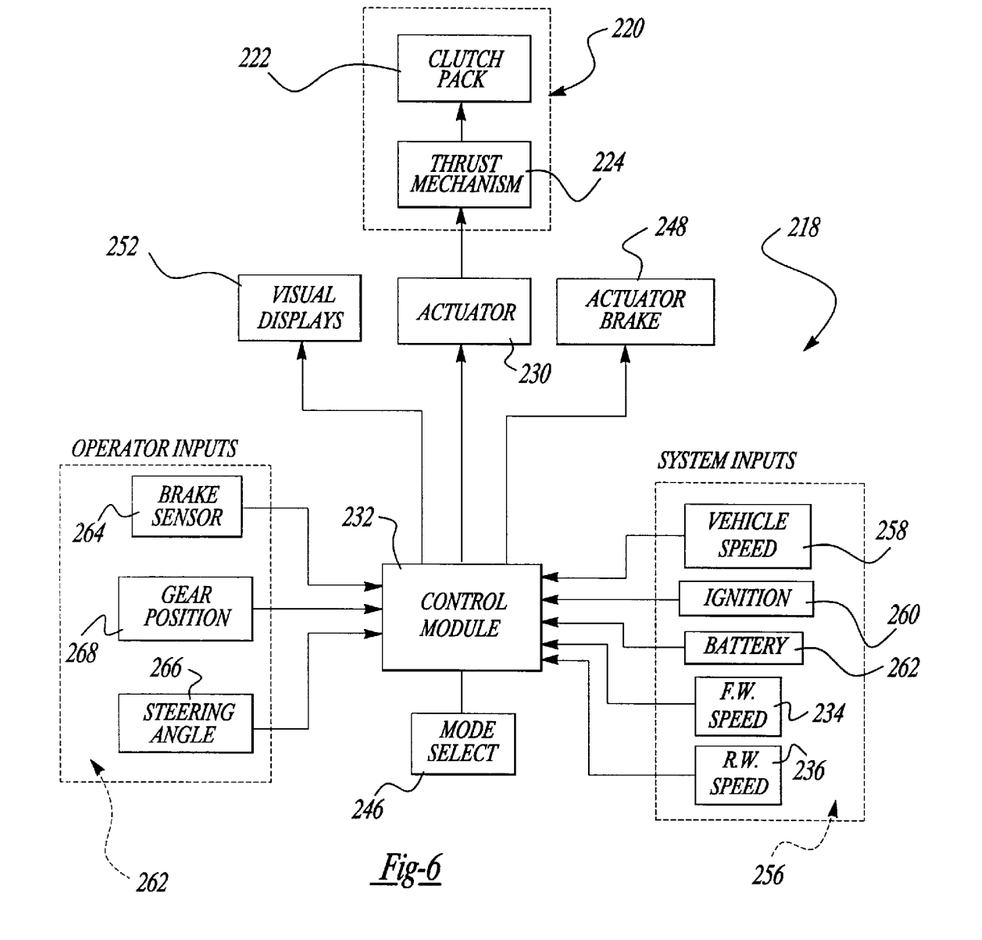
FIG. 6 is a block diagram of a control system for use with a power transfer mechanism equipped with an electrically-actuated transfer clutch.

As an alternative to the passive transfer clutch shown in FIGS. 3 and 5, FIG. 6 illustrates a block diagram for an electronically-controlled power transfer system 218 that can be used to adaptively control the actuated condition of an electrically-actuated transfer clutch 220. Preferably, transfer clutch 220 is a friction clutch assembly having a multi-plate clutch pack 222 and a thrust mechanism 224 which applies a clutch engagement force on clutch pack 222. Thrust mechanism 224 is caused to move relative to clutch pack 222 in response to actuation of a power-operated actuator 230 which receives electric control signals from a controller 232. Actuator 230 can be any type (i.e., electromechanical, electromagnetic, hydraulically-actuated, etc.) of power-operated device suitable for causing controlled movement of thrust mechanism 224. To this end, system 218 includes a front speed sensor 234 for measuring the rotational speed ($n_F$) of front output shaft 112 (or front propshaft 34) and a rear speed sensor 236 for measuring the rotational ($n_R$) speed of rear output shaft 100 (or rear propshaft 40). The speed signals from sensors 234 and 236 are delivered to controller 232 which determines the magnitude of a speed differential ($\Delta N = n_r - n_f$). If the speed differential exceeds a predetermined threshold value, then controller 232 sends a control signal to actuator 230 for causing thrust mechanism 224 to apply a clutch engagement force to clutch pack 222, whereby drive torque is transferred through transfer clutch 220 to front output shaft 112. The threshold value can be stored in look-up tables or calculated from stored algorithms. The control scheme for actuator 230 can be used to vary the magnitude of the clutch engagement force as a function of changes in the magnitude of the speed differential.

Figure 7:
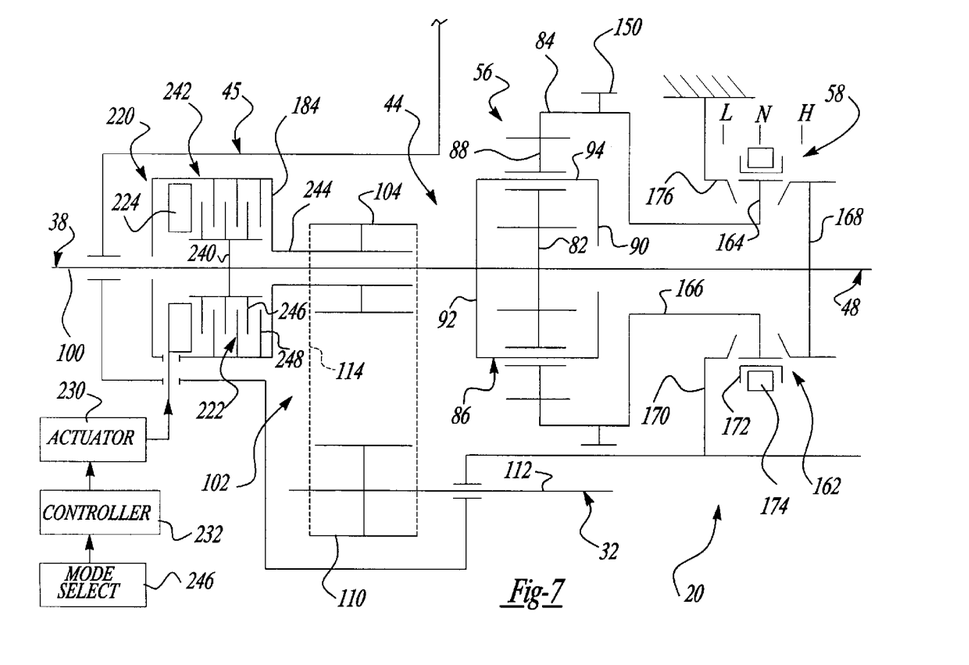
FIG. 7 is a partial sectional view illustrating the power transfer mechanism equipped with an electrically-actuated transfer clutch.

Referring now to FIG. 7 of the drawings, power transfer mechanism 44 for transmission 20 is partially shown to now include electrically-controlled transfer clutch 220 in place of passive transfer clutch 60. Transfer clutch 220 is a mechanically-actuated friction clutch assembly arranged to concentrically surround a portion of rear output shaft 100. Transfer clutch 220 includes an inner drum 240 that is fixed to rear output shaft 100 for rotation therewith. An outer drum 242 surrounds inner drum 240 to form an annular chamber therebetween, with outer drum 242 and inner drum 240 capable of rotating relative to one another. Outer drum 242 has a hub 244 rotatably supported on rear output shaft 100 and to which drive sprocket 104 is fixed. Disposed within the chamber is clutch pack 222 comprised of two sets of alternatively interleaved friction clutch plates that can be frictionally compressed by thrust mechanism 224 for limiting speed differentiation and varying the torque distribution between front output shaft 112 and rear output shaft 110. Inner clutch plates 246 are splined to inner drum 240 for driven rotation with rear output shaft 100. Likewise, outer clutch plates 248 are splined to outer drum 242 for rotation with front output shaft 112. The interleaved clutch plates are supported for limited axial sliding movement to establish frictional contact therebetween. Thrust mechanism 224 can be any type of apply device (i.e., pivotal lever arm, piston, cam plates, etc.) which is caused to move with respect to clutch pack 222 in response to actuation of actuator 230. A non-limiting example of a known arrangement is disclosed in commonly owned U.S. Pat. No. 5,582,263.

As noted, controller 232 can be programmed to automatically control actuation of transfer clutch 220 and, thus, engagement of the on-demand four-wheel drive mode for transmission 20. Controller 232 can be programmed to regulate the actuated condition of transfer clutch 220 between its non-actuated and fully-actuated limits for varying the magnitude of speed differentiation and drive torque transmitted as a function of the speed sensor input signals. As such, control over actuation of transfer clutch 220 is automatic and does not require any act or mode selection on the part of the vehicle operator.

As a further option, a mode select mechanism 208 can be incorporated into system 218 to permit the vehicle operator to select one of an "Automatic" fourwheel drive mode and a "Locked" four-wheel drive mode. When the Automatic mode is selected, the actuated condition of transfer clutch 220 is controlled without input from the vehicle operator. However, when the "Locked" drive mode is selected, transfer clutch 220 is fully-actuated for delivering non-differentiated drive torque to output shafts 112 and 100. Moreover, a brake 250 can be used for braking the output member of actuator 230 to maintain thrust mechanism 224 in engagement with clutch pack 222 following selection via mode select mechanism 208 of the Locked mode. Brake 250 permits the power to actuator 230 to be interrupted for minimizing its on-time service requirements. The "Locked" four-wheel drive mode is provided for permitting improved traction when the motor vehicle is being operated off-road or on severe road conditions. Mode select mechanism 208 can include any suitable selector mechanism (i.e., shift lever, push-button, etc.) capable of generating a mode signal inputted to controller 232.

With reference again to FIG. 6, a block diagram of control system 218 is shown. Preferably, controller 232 is an electronic control module having signal processing and information storage capabilities. A visual display 252 is provided within the passenger compartment of the vehicle to indicate the particular mode selected by mode select mechanism 208. In addition to speed sensors 234 and 236, a first sensor group 256 is shown to optionally include various "system" sensors that can be provided for detecting and signaling specific dynamic and operational characteristics of the motor vehicle. The input signals generated by the "systems" sensor group are delivered to electronic control module 232. First sensor group 256 includes a vehicle speed sensor 258 for sensing a vehicle speed, an ignition switch 260 for signalling the operational status of the vehicle, and a battery input 262 for powering electronic control module 232. In vehicles equipped with an anti-lock brake system (ABS), the original equipment ABS sensors provided at each wheel can be used for determining an "average" front drive shaft speed and rear drive shaft speed. Moreover, it is possible for vehicle speed sensor 258 to be eliminated with the vehicle speed signal being computed from the front rotational speed signal generated by front speed sensor 234. However, it is to be understood that any suitable speed sensing arrangement capable of generating a signal indicative of the rotational speed of a shaft is fairly within the scope of the present invention.

Control system 218 also illustrates the optional use of various "operator-initiated" inputs, as generally categorized by second sensor group 262. These inputs include a brake sensor 264 for sensing when the vehicle operator is applying the brakes, a steering angle sensor 266 for detecting the magnitude of a steering angle, and an accelerator sensor for sensing an accelerating condition of the vehicle. Preferably, the accelerator sensor is a throttle position sensor 268 for sensing the degree of opening of a throttle valve associated with engine 18 or for sensing the degree of depression of an accelerator pedal, and is operable to produce a throttle position signal. The operator-initiated input signals are delivered to control module 232 where they are used, in conjunction with the system input signals, to further control "on-demand" four-wheel drive operation. It is contemplated that any control system operable for controlling actuation of actuator 230 based on predetermined relationship(s) between the speed difference (ΔN) and the desired torque distribution between the drivelines can be used with the present invention. An example of one suitable control system applicable to adaptively control transfer clutch 220 is disclosed in commonly-owned U.S. Pat. No. 5,582,263.

Figure 8:
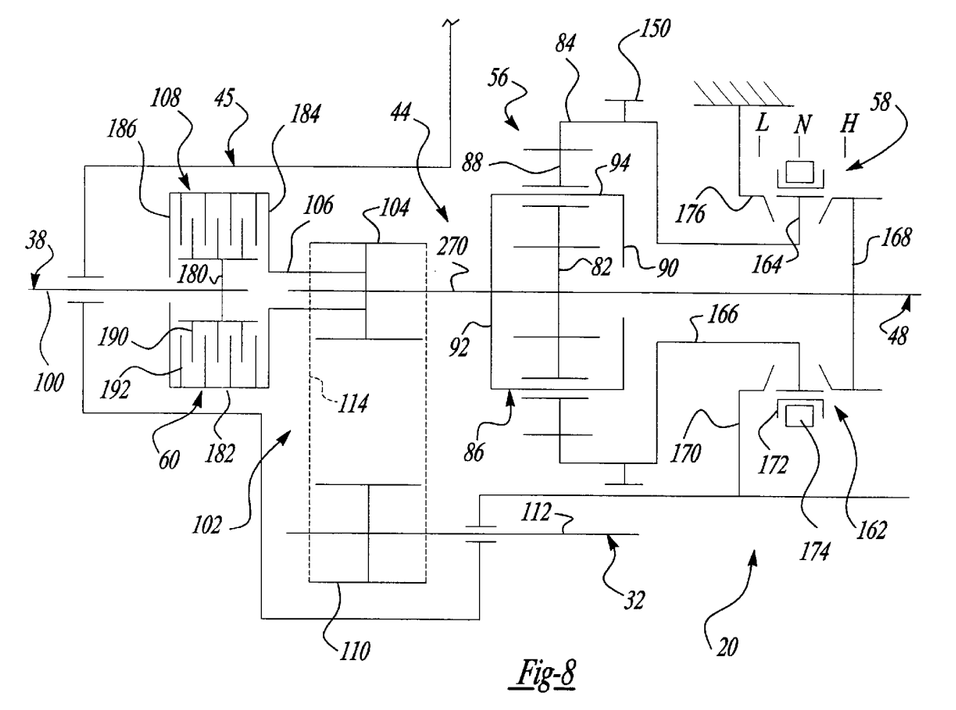
FIG. 8 is a schematic view of a modified arrangement for the power transfer mechanism of the transmission.

In the previous embodiments, the primary driveline was defined as rear driveline 14 such that the vehicle is normally a rear wheel drive (RWD) vehicle when transfer clutch 60 or 220 deactuated. However, those skilled in the art will appreciate that the power transfer mechanism 44 of transmission 20 can be modified to establish front driveline 12 as the primary driveline. As an example, FIG. 8 shows a modified version of the power transfer mechanism shown in FIG. 3 such that a transfer shaft 270 now connects rear carrier plate 92 of carrier assembly 86 to drive sprocket 104 for normally driving front output shaft 112. In addition, outer drum 108 of transfer clutch 60 is driven by drive sprocket 104 (or transfer shaft 270) and inner drum 180 is fixed to rear output shaft 100. Thus, transfer clutch 60 functions to transfer drive torque on-demand to rear output shaft 100 in response to slip of front driveline 12. Obviously, the power transfer mechanism of FIG. 8 could be further modified to include a mode shift arrangement in connection with transfer clutch 60 that is similar to that shown in FIG. 5, or incorporate electrically-actuated transfer clutch 220 in a manner similar to that shown in FIG. 7.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A transmission for use in a four-wheel drive motor vehicle having an engine and primary and secondary drivelines, said transmission comprising:

an input shaft adapted to be driven by the engine;

a mainshaft;

a first output shaft adapted to drive the primary driveline;

a second output shaft adapted to drive the secondary driveline;

constant mesh gearsets which can be selectively engaged to couple said mainshaft to said input shaft for driven rotation at predetermined speed ratios, said gearsets each including a first gear mounted on said input shaft and a second gear mounted on said mainshaft, said first and second gears of said gearsets being in constant mesh with one another;

a planetary gearset having a sun gear driven by said mainshaft, a ring gear, a carrier driving said first output shaft, and a set of pinion gears each meshed with said sun gear and said ring gear and each rotatably supported on said carrier;

a range clutch which can be selectively engaged to couple said ring gear to said mainshaft for driving said first output shaft at a first speed ratio relative to said mainshaft, and said range clutch can further be selectively engaged to couple said ring gear to a stationary member for driving said first output shaft at a second speed ratio relative to said mainshaft;

a shift mechanism for controlling selective engagement of said constant mesh gearsets and said range clutch to establish a plurality of forward and reverse gears; and a transfer clutch for automatically transferring drive torque from said first output shaft to said second output shaft in response to a speed differential therebetween.

2. The transmission of claim 1 wherein said range clutch includes a range sleeve mounted for rotation with said ring gear and movement between a first position whereat said ring gear is coupled to said mainshaft and a second position whereat said ring gear is coupled to a housing, a first synchronizer for causing speed synchronization between said ring gear and said mainshaft in response to movement of said range sleeve to said first position, and a second synchronizer for causing speed synchronization between said ring gear and said housing in response to movement of said range sleeve to said second position.

3. The transmission of claim 1 wherein said first output shaft is a rear output shaft and said primary driveline is a rear driveline.

4. The transmission of claim 1 further comprising a mode clutch which can be selectively engaged to couple said second output shaft to said first output shaft.

5. The transmission of claim 1 further comprising a drive mechanism coupled to said second output shaft, said transfer clutch operably positioned between said drive mechanism and said first output shaft for transferring drive torque to said drive mechanism.

6. The transmission of claim 1 wherein said transfer clutch is a viscous coupling.

7. The transmission of claim 1 wherein said transfer clutch includes a clutch pack, and an actuator for controlling a clutch engagement force exerted on said clutch pack, said actuator being actuated by control signals sent thereto by a controller.

8. The transmission of claim 7 wherein said controller receives sensor input signals indicative of operating characteristics of the vehicle and generates said control signals in response to said sensor input signals.

9. The transmission of claim 8 wherein said sensor input signals include front and rear speed signals that are indicative of a rotary speed of said first and second output shafts, and wherein said controller determines a speed difference between said first and second output shafts based on said speed signals and controls actuation of said actuator as a function of said speed difference.

10. The transmission of claim 9 wherein said controller employs an on/off control scheme for controlling actuation of said actuator.

11. The transmission of claim 9 wherein said controller employs an adaptive control scheme for controlling variable actuation of said actuator.

12. The transmission of claim 8 further comprising a mode select mechanism capable of generating a mode signal which is sent to said controller and is indicative of selection of one of an Automatic mode and a Locked mode, said controller causes said actuator to fully engage said transfer clutch when said Locked mode is selected, and said controller controls actuation of said transfer clutch as a function of said operating characteristics when said Automatic mode is selected.

13. A transmission for use in a four-wheel drive motor vehicle having an engine and primary and secondary drivelines, said transmission comprising:

an input shaft adapted to be driven by the engine;

a mainshaft;

a first output shaft adapted to drive the primary driveline;

a second output shaft adapted to drive the secondary driveline;

constant mesh gearsets supported between said input shaft and said mainshaft and which can be selectively engaged to couple said mainshaft to said input shaft for driven rotation at predetermined speed ratios;

a planetary gearset having a sun gear driven by said mainshaft, a ring gear, a carrier driving said first output shaft, and a set of pinion gears each meshed with said sun gear and said ring gear and each rotatably supported on said carrier;

a range clutch which can be selectively engaged to couple said ring gear to said mainshaft for driving said first output shaft at a first speed ratio relative to said mainshaft, and said range clutch can further be selectively engaged to couple said ring gear to a stationary member for driving said first output shaft at a second speed ratio relative to said mainshaft;

a shift mechanism for controlling selective engagement of said constant mesh gearsets and said range clutch to establish a plurality of forward and reverse gears;

a transfer clutch for automatically transferring drive torque from said first output shaft to said second output shaft in response to a speed differential therebetween; and wherein said constant mesh gearsets include a first input gear rotatably supported on said input shaft, a first compound gear rotatably supported on said mainshaft and having a first drive gear meshed with said first input gear and a second drive gear, a second compound gear rotatably supported on said input shaft and having a second input gear meshed with said second drive gear and a third input gear, a third drive gear rotatably supported on said mainshaft and meshed with said third input gear, a first synchronizer clutch for selectively coupling one of said first and second input gears to said input shaft, and a second synchronizer clutch for selectively coupling one of said second and third drive gears to said mainshaft.

14. The transmission of claim 13 wherein said constant mesh gearsets further include a reverse input gear meshed with said third input gear, a reverse output gear meshed with a transfer gear fixed to said ring gear, and a third synchronizer clutch for selectively coupling said reverse output gear to said reverse input gear.

15. A transmission for use in a four-wheel drive motor vehicle having an engine and front and rear drivelines, said transmission comprising:

an input shaft adapted to be driven by the engine;

a mainshaft;

a front output shaft adapted to drive the front driveline;

a rear output shaft adapted to drive the rear driveline;

constant mesh gearsets which can be selectively engaged to couple said mainshaft to said input shaft for driven rotation at predetermined speed ratios, said gearsets each including a first gear mounted on said input shaft and a second gear mounted on said mainshaft, said first and second gears of said gearsets being in constant mesh with one another;

a planetary gearset having a sun gear driven by said mainshaft, a ring gear, a carrier coupled to said rear output shaft, and a set of pinion gears each meshed with said sun gear and said ring gear and each rotatably supported on said carrier;

a range clutch which can be selectivley engaged to couple said ring gear to said mainshaft for driving said rear output shaft at a first speed ratio relative to said mainshaft, said range clutch can further be selectively engaged to couple said ring gear to a stationary member for driving said rear output shaft at a second speed ratio relative to said mainshaft;

a transfer clutch for controlling torque distribution and speed differentiation between said front and rear output shafts by varying a clutch engagement force exerted on a clutch pack, said transfer clutch including a thrust mechanism operable in a first position to establish a minimum clutch engagement force and in a second position to establish a maximum clutch engagement force, and an actuator for moving said thrust mechanism;

a sensor for detecting an operating characteristic of the vehicle and generating a sensor input signal in response thereto; and a controller for receiving said sensor input signal and controlling actuation of said actuator in accordance with said operating characteristic.

16. The transmission of claim 15 wherein said range clutch includes a range sleeve mounted for rotation with said ring gear and movement between a first position whereat said ring gear is coupled to said mainshaft and a second position whereat said ring gear is coupled to a housing, a first synchronizer for causing speed synchronization between said ring gear and said mainshaft in response to movement of said range sleeve to said first position, and a second synchronizer for causing speed synchronization between said ring gear and said housing in response to movement of said range sleeve to said second position.

17. The transmission of claim 15 wherein said sensor includes speed sensors for sensing rotational speed of said front and rear output shafts and generating front and rear speed signals indicative thereof, and wherein said controller receives said speed signals and generates a speed differential signal that is indicative of a speed differential between said front and rear output shafts, and wherein said controller is operable for continuously controlling actuation of said actuator in proportion to variations in said speed differential signal.

18. The transmission of claim 17 further comprising a mode select mechanism for enabling a vehicle operator to select one of an Automatic four-wheel drive mode and a Locked four-wheel mode and generate a mode signal indicative of the particular mode selected, and wherein said controller controls actuation of said actuator in accordance with said speed differential signal and said mode signal, said controller causing said actuator to move said thrust mechanism between said first and second positions as a function of said speed differential signal for continuously varying the torque transmitted through said transfer clutch when said Automatic four-wheel drive mode is selected, said controller is further operable for causing said actuator to move said thrust mechanism to said second position when said Locked four-wheel drive mode is selected.

19. The transmission of claim 15 wherein said sensor includes speed sensors for sensing rotational speed of said front and rear output shafts and generating front and rear speed signals indicative thereof, and wherein said controller receives said speed signals and generates a speed differential signal that is indicative of a speed differential between said front and rear output shafts, said controller is operable for controlling actuation of said actuator in accordance with said speed differential signal for moving said thrust mechanism from said first position toward said second position when said speed differential signal exceeds a predetermined value and for moving said thrust mechanism from said second position toward said first position when said speed differential signal is less than said predetermined value.

20. The transmission of claim 19 further comprising a mode select mechanism for enabling a vehicle operator to select one of an Automatic four-wheel drive mode and a Locked four-wheel mode and generate a mode signal indicative of the particular mode selected, and wherein said controller controls actuation of said actuator in accordance with said speed differential signal and said mode signal, said controller causing said actuator to control movement of said thrust mechanism between said first and second positions as a function of said speed differential signal when said Automatic four-wheel drive mode is selected, said controller further operable for causing said actuator to move said thrust mechanism to said second position when said Locked four-wheel drive mode is selected.

21. A transmission for use in a four-wheel drive motor vehicle having an engine and front and rear drivelines, said transmission comprising:

an input shaft adapted to be driven by the engine;

a mainshaft;

a front output shaft adapted to drive the front driveline;

a rear output shaft adapted to drive the rear driveline;

constant mesh gearsets supported between said input shaft and said mainshaft and which can be selectively engaged to couple said mainshaft to said input shaft for driven rotation at predetermined speed ratios;

a planetary gearset having a sun gear driven by said mainshaft, a ring gear, a carrier coupled to said rear output shaft, and a set of pinion gears each meshed with said sun gear and said ring gear and each rotatably supported on said carrier;

a range clutch which can be selectively engaged to couple said ring gear to said mainshaft for driving said rear output shaft at a first speed ratio relative to said mainshaft, said range clutch can further be selectively engaged to couple said ring gear to a stationary member for driving said rear output shaft at a second speed ratio relative to said mainshaft;

a transfer clutch for controlling torque distribution and speed differentiation between said front and rear output shafts by varying a clutch engagement force exerted on a clutch pack, said transfer clutch including a thrust mechanism operable in a first position to establish a minimum clutch engagement force and in a second position to establish a maximum clutch engagement force, and an actuator for moving said thrust mechanism;

a sensor for detecting an operating characteristic of the vehicle and generating a sensor input signal in response thereto; and a controller for receiving said sensor input signal and controlling actuation of said actuator in accordance with said operating characteristic; and wherein said constant mesh gearsets include a first input gear rotatably supported on said input shaft, a first compound gear rotatably supported on said mainshaft and having a first drive gear meshed with said first input gear and a second drive gear, a second compound gear rotatably supported on said input shaft and having a second input gear meshed with said second drive gear and a third input gear, a third drive gear rotatably supported on said mainshaft and meshed with said third input gear, a first synchronizer clutch for selectively coupling one of said first and second input gears to said input shaft, and a second synchronizer clutch for selectivley coupling one of said second and third drive gears to said mainshaft.

22. The transmission of claim 21 wherein said constant mesh gearsets further include a reverse input gear meshed with said third input gear, a reverse output gear meshed with a transfer gear fixed to said ring gear, and a third synchronizer clutch for selectively coupling said reverse output gear to said reverse input gear.

* * * * *